United States Patent
Gnutzmann

(12) 
(10) Patent No.: US 7,317,543 B2
(45) Date of Patent: Jan. 8, 2008

(54) METHOD OF CONVERTING A LINEWORK DATA FORMAT TO THE FORMAT OF A PAGE DESCRIPTION LANGUAGE

(75) Inventor: Frank Gnutzmann, Gettorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 799 days.

(21) Appl. No.: 10/350,409

(22) Filed: Jan. 24, 2003

(65) Prior Publication Data

US 2003/0147098 A1    Aug. 7, 2003

(30) Foreign Application Priority Data

Feb. 6, 2002    (DE)  ............... 102 04 751

(51) Int. Cl.
*G06K 15/00*    (2006.01)
*G06K 9/46*    (2006.01)

(52) U.S. Cl. ............ 358/1.11; 358/1.9; 358/1.13; 382/183; 382/185; 382/243; 382/245

(58) Field of Classification Search ........ 358/1.13, 358/1.9, 1.11, 426.01, 426.02; 382/183, 382/185, 245, 242, 243
See application file for complete search history.

(56) References Cited

U.S. PATENT DOCUMENTS

| | | | | |
|---|---|---|---|---|
| 5,726,760 A | * | 3/1998 | Luttmer | 382/245 |
| 5,752,057 A | | 5/1998 | Lifshitz et al. | |
| 5,872,870 A | * | 2/1999 | Michael | 382/291 |
| 6,055,064 A | * | 4/2000 | Lifshitz et al. | 358/1.9 |
| 6,104,500 A | * | 8/2000 | Alam et al. | 358/1.15 |

\* cited by examiner

*Primary Examiner*—Twyler Lamb
*Assistant Examiner*—Chan S. Park
(74) *Attorney, Agent, or Firm*—Laurence A. Greenberg; Werner H. Stemer; Ralph E. Locher

(57) ABSTRACT

A method for converting image data coded with run lengths to the format of a page description language, such as PostScript or PDF, the run lengths identifying how many image points of one color follow one another in an image row, includes utilizing the run lengths of the same color that overlap in successive image rows to form an object, and describing the object with operators from the page description language. Objects of the same color can be combined to form one object. An object is described in the page description language by the image mask operator and an associated bitmap, or by a polygon train that connects reference points on the edge of the object.

15 Claims, 5 Drawing Sheets

Run Lengths

| Row 1: | [0 \| 16] | [11 \| 3] | [0 \| 1] | | |
|---|---|---|---|---|---|
| Row 2: | [0 \| 15] | [11 \| 4] | [0 \| 1] | | |
| Row 3: | [0 \| 4] | [12 \| 2] | [0 \| 8] | [11 \| 4] | [0 \| 2] |
| Row 4: | [0 \| 3] | [12 \| 3] | [0 \| 7] | [11 \| 4] | [0 \| 3] |
| Row 5: | [0 \| 3] | [12 \| 4] | [0 \| 5] | [11 \| 4] | [0 \| 4] |
| Row 6: | [0 \| 1] | [12 \| 6] | [0 \| 13] | | |
| Row 7: | [0 \| 1] | [12 \| 4] | [13 \| 5] | [0 \| 10] | |
| Row 8: | [0 \| 2] | [12 \| 3] | [13 \| 5] | [0 \| 10] | |
| Row 9: | [0 \| 5] | [13 \| 5] | [0 \| 10] | | |
| Row 10: | [0 \| 5] | [13 \| 5] | [0 \| 10] | | |
| Row 11: | [0 \| 20] | | | | |
| Row 12: | [0 \| 20] | | | | |

LINEWORK
FIG. 6A
LINEWORK
FIG. 6B
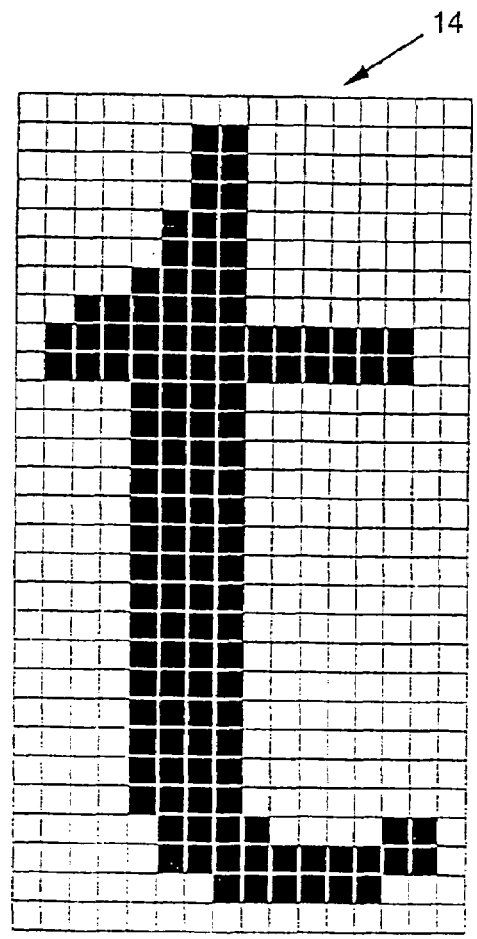
FIG. 7
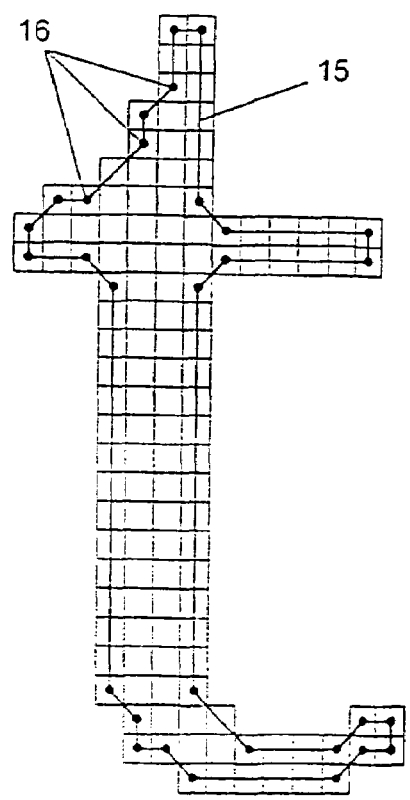
FIG. 8

METHOD OF CONVERTING A LINEWORK DATA FORMAT TO THE FORMAT OF A PAGE DESCRIPTION LANGUAGE

BACKGROUND OF THE INVENTION

Field of the Invention

The invention relates to the field of electronic reproduction technology and pertains to a method of converting a linework data format to the format of a page description language, such as PostScript or Portable Document Format (PDF).

In reproduction technology, printing originals for printing pages are produced that contain all of the elements to be printed, such as texts, graphics, and images. For colored printing, a separate printing original is produced for each printing ink, containing all the elements that are printed in the respective color. For four-color printing, these are the printing inks cyan, magenta, yellow, and black (C, M, Y, K). The printing originals separated by printing inks are also referred to as color separations. The printing originals are generally rastered and exposed at high resolution onto films, which are, then, processed further to produce the printing forms (printing plates, printing cylinders). Alternatively, the printing originals can also be exposed directly onto printing plates in special recorders or transmitted directly as digital data to a digital press.

In the case of the electronic production of the printing originals, the page elements are present in the form of digital data. For an image, the data is produced, for example, by scanning the image point-by-point and row-by-row in a scanner, each image point being broken down into color components and the color values of these components being digitized. The data for texts and graphics is generally produced directly in a computer by text processing and drawing programs. Depending on the output process subsequently used, for example, output on a color printer or printing on a conventional or digital press, the data for the page elements are produced in the color components red, green, and blue (RGB) or in the printing inks of four-color printing, cyan, magenta, yellow, and black (CMYK), and are stored.

In the further operating sequence, the digitized texts, graphics, and images are mounted electronically on a color monitor or automatically in accordance with stored layout stipulations in a processing station with visual inspection, that is to say, the page elements are assembled, for example, in a memory area of the processing station, in accordance with the layout to form a printed page. The finished printed page is converted into a data format suitable for the output and is stored. The printed page data for each of the printing inks (RGB or CMYK) is referred to as color separation data. By using the color separation data, printing plates are produced for a conventional press or the data is transmitted directly to a fast color printer or to a digital press and printed out there. Instead of individual printed pages, printing originals can also contain the content of a relatively large printed sheet, which includes a configuration of a plurality of printed pages.

The operating sequence that is predominantly used according to the prior art during the output of printing originals for printed pages or printed sheets that have been produced in a page description language, such as PostScript or PDF, is shown in FIG. 1. The operating sequence will be explained for the page description language PDF, which is a further development of PostScript. The PDF data 1 are supplied to a raster image processor (RIP) 2, which can be a computer specifically optimized for this task or a program on a standard computer. In the normal case, PDF data 1 is produced in the processing station, containing all the color separations together (composite PDF). Alternatively, PDF data 1 separated by color separations can also be produced for a printed page and passed on to the RIP 2 (separated PDF). In the following text, the case of composite PDF data 1 will be explained further.

In a first step, the PDF data 1 is analyzed in an interpreter 3 and broken down into a sequence of simple graphic objects, a display list 4, as it is referred. In the display list 4, for each object its geometric shape is described and with which color values it is filled. In the RIP 2, the display list 4 is fed in a further step to a raster generator 5 that converts the objects from the display list 4 one after another into areas filled with halftone dots and writes them as high-resolution bitmap data 6 into a bitmap memory 7. The halftone dot size is in this case varied in accordance with the color separation values of the image points in the object. During the rastering process, the division into the color separations can be carried out at the same time, that is to say, for each color separation separate bitmap data 6 is stored, which specifies at which point on the printed page the corresponding printing ink is to be printed and which halftone dot sizes are to be printed there. After all the objects have been rastered by the raster generator 5 and written into the bitmap memory 7, the content of the bitmap memory 7 for a specific color separation is passed on to a recorder 8, for example, and exposed onto a printing plate there.

The operating sequence described presupposes that all the printed pages to be output have been produced as PDF data 1. However, in practical reproduction technology this is not always the case. Printed pages are sometimes created on earlier processing stations that cannot produce any PDF data. Alternatively, printed pages or parts of printed pages that were created earlier and that have not been stored as PDF data are to be reused, for example, advertising pages already configured in finished form. A data format often used in reproduction technology for storing finished printed pages, which was particularly widespread before the introduction of the operating sequence based on the page description languages PostScript or PDF, is the data format TIFF/IT. The abbreviation stands for "tag image file format" for "image technology." The format was standardized by the International Organization for Standardization as the Standard ISO 12639: 1998. As opposed to PDF, TIFF/IT is not a page description language but an image-point oriented data format. Printed page data present in the TIFF/IT data format has to be converted to PDF data before integration in the described PDF operating sequence.

TIFF/IT data includes up to three components:
a) Color continuous tone picture image (CT) data: a background image that is generally as large as a page and that combines all the colored images on the printed page. The resolution corresponds to a resolution for scanned images that is normal in reproduction technology, for example 120 image points/cm.
b) Color linework (LW) image data: run-length format for up to 255 different indexed colors, that is to say, colors that can be distinguished by a color index. The LW data is normally used for high-resolution graphics and texts. The resolution is considerably higher than for the CT data, for example, 1000 image points/cm.
c) High resolution continuous tone (HC) image data: a run-length format for any desired number of different colors at the same resolution as for the LW data. HC data is generally used for high-resolution contours on images, for example, when two images adjoin each other directly and the boundary line is to have a higher resolution than the image resolution. HC data often occupies only a small proportion of the area on the printed page.

A complete TIFF/IT "final page" file generally includes a CT component, an LW component, and an HC component. However, components that are not needed can be left out. The positioning data for the different components is located in the "final page" file, a paperclip for the three components. Most TIFF/IT files have a CT component, many have an LW component, and few an HC component.

Converting the CT components of the TIFF/IT format into PDF compatible data is relatively simple because colored image data are provided in the form of a two-dimensional configuration of image points in PDF as one of the possible ways of describing contents of a printed page. The conversion of the LW component and the HC component into PDF-compatible data is more difficult because the description of printed page contents with run lengths of colors is not envisaged in PDF. The LW run lengths and HC run lengths, therefore, have to be converted to description elements that are available in the PDF format, and the conversion should be carried out without a loss of quality and managed with the lowest possible memory requirement.

FIG. 2A shows the structure of a run length in the linework component that, in the simplest case, includes two bytes. The first byte contains a color index FNR and the second byte the length LG of the image points of this color following one another in one row, as an 8-bit binary number. If a sequence of image points of the same color is greater than 255, it is divided up into one or more partial run-lengths of 255 image points and a remaining run length. In addition to the run lengths, the linework component contains a color table, in which, for each color index, the CMYK color values to be printed are entered as four bytes. By using the color index as an index into the color table, each run length can be assigned the associated color. In addition to the 2-byte form, there is also a 4-byte form of the run lengths, in which the length LG is coded as a 16-bit binary number.

FIG. 2B shows the structure of a run length in the HC component, which includes six bytes. The first two bytes contain a length LG as a 16-bit binary number, the following four bytes indicate the color separation values CMYK directly. As a result, the number of different colors that can be coded is not restricted.

A method of converting a high-resolution linework component into a PostScript description is disclosed in U.S. Pat. No. 5,752,057 to Lifshitz et al. FIG. 3 illustrates the method using the example of a letter from a high-resolution text component of the printed page. Each individual run length from the linework component is described in the PostScript data as a horizontal stroke 9, the coordinates of the starting point and its length having to be specified for each stroke 9. The thickness of the strokes 9 for all the strokes is equal to the height of a row in the linework component. In FIG. 3, for the purpose of simpler representation, the strokes 9 are shown with a very course resolution. In reality, the result for the resolution of 1000 image points/cm is, for example, 300 strokes 9 over the height of a letter with a font size of 12 points. Such a prior art method, therefore, has the disadvantage that the PostScript description requires a relatively large amount of storage space because of the many strokes 9 into which a graphic or text element is divided up, and that the conversion and the subsequent interpretation of the PostScript description are correspondingly slow. A further serious disadvantage is that the strokes 9 are all individual objects separated logically from one another, that is to say, it is no longer possible to detect, from the PostScript description, which strokes 9 belong to an original object, such as a letter. This makes interactive reworking of the converted linework elements, for example, displacement, enlargement, or recoloration of an original object, virtually impossible.

SUMMARY OF THE INVENTION

The conversion of the LW component and of the HC component from TIFF/IT data to equivalent PDF data is the subject of the present patent application.

It is accordingly an object of the invention to provide a method of converting a linework data format to the format of a page description language that overcomes the hereinafore-mentioned disadvantages of the heretofore-known devices and methods of this general type and that avoids the aforementioned disadvantages and provides a method with which high-resolution run-length coded printed page data, such as a linework LW component or a high resolution continuous tone HC component of the TIFF/IT data format can be converted to PDF data, the amount of converted data being small, the conversion and the interpretation of the converted PDF data being carried out quickly, and simple reworking of the converted graphic and text objects being possible.

With the foregoing and other objects in view, there is provided, in accordance with the invention, a method for converting image data coded with run lengths to a format of a page description language, the run lengths identifying how many image points of one color follow one another in one image row, includes the steps of forming at least one object utilizing run lengths of a same color that overlap in successive image rows and describing the object with operators from the page description language.

In accordance with another feature of the invention, there is provided the step of determining a circumscribing rectangle belonging to the object during formation of the object.

In accordance with a further feature of the invention, there is provided the step of determining if the object is a rectangle during formation of the object In accordance with an added feature of the invention, there are provided the steps of forming a plurality of objects utilizing run lengths of a same color that overlap in successive image rows, describing each of the objects with operators from the page description language, and combining objects of the same color in one circumscribing rectangle.

In accordance with an additional feature of the invention, there is provided the step of dividing up the object into partial objects.

In accordance with yet another feature of the invention, there is provided the step of not combining objects that are a rectangle with other objects.

In accordance with yet a further feature of the invention, there is provided the step of describing the object in the page description language with an image mask operator and an associated bitmap.

In accordance with yet an added feature of the invention, an object that is a rectangle is described in the page description language with a rectangle operator.

In accordance with yet an additional feature of the invention, the object has an edge, and the object is described in the page description language as a polygon train connecting reference points on the edge of the object.

In accordance with again another feature of the invention, there is provided the step of approximating parts of the polygon train by at least one of interpolated straight-line sections and interpolated curve sections.

In accordance with a concomitant feature of the invention, there is provided the step of approximating parts of the polygon train by at least one of interpolated straight-line and curve sections.

Other features that are considered as characteristic for the invention are set forth in the appended claims.

Although the invention is illustrated and described herein as embodied in a method of converting a linework data format to the format of a page description language, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 6A is a diagrammatic illustration of separate objects;

FIG. 6B is a diagrammatic illustration of a combination of the objects of FIG. 6A;

FIG. 7 is a bitmap of an image mask operator of an object;

FIG. 8 is a diagrammatic illustration of polygon train of the object of FIG. 7.

DESCRIPTION OF THE PREFERRED EMBODIMENTS

Figure 1:
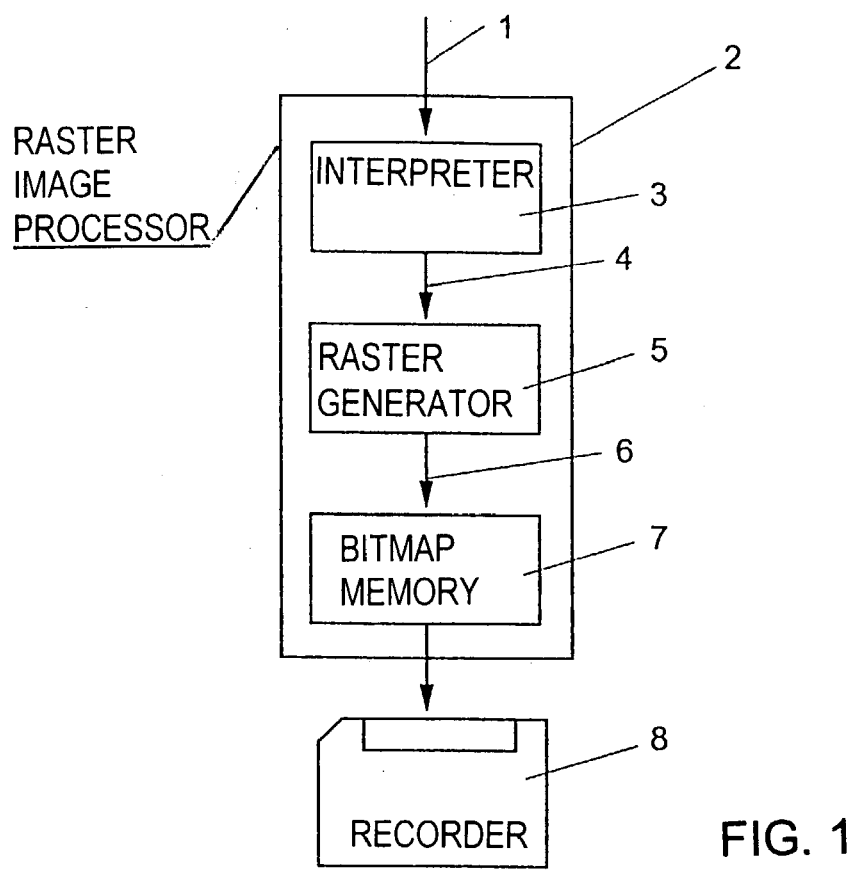
FIG. 1 is a block circuit diagram of an operating sequence for the output of a printing original according to the prior art.
Figure 2A:
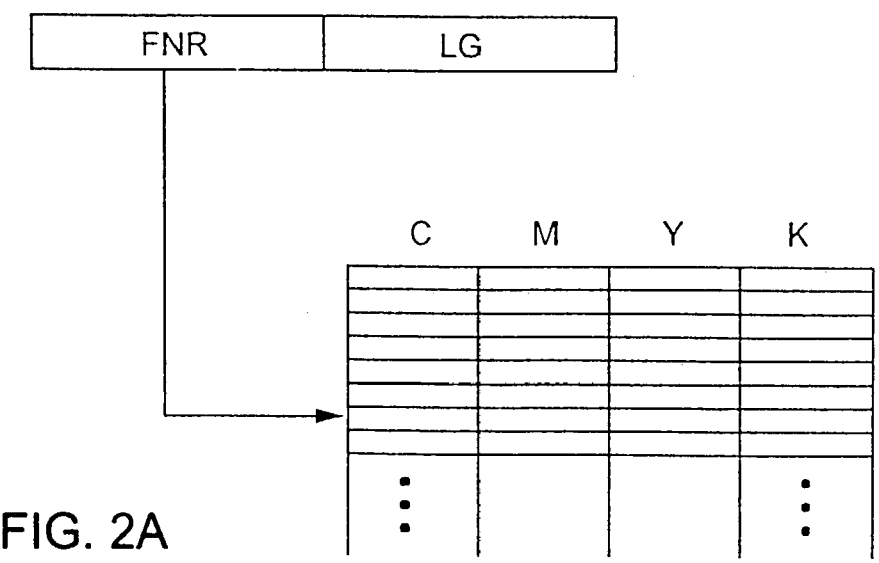
FIG. 2A is a fragmentary, diagrammatic structure of a run length of an LW component.
Figure 2B:
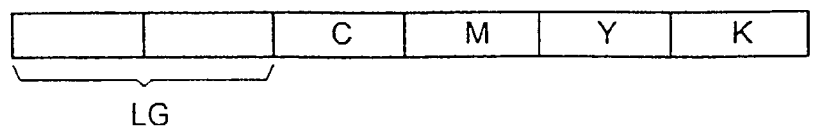
FIG. 2B is a diagrammatic structure of a run length of an HC component.
Figure 3:
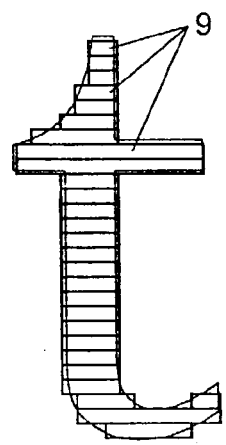
FIG. 3 is a diagrammatic illustration of a prior art conversion of a letter to PDF data.

The method of the invention and its processing steps will be explained in the following text for a linework component from the TIFF/IT data format. However, the method can be applied in the same way to an HC component or any other desired run-length coded data format. For this purpose, referring now to the figures of the drawings in detail and first, particularly to FIGS. 4A and 4B thereof, there is shown an example of a simple linework component, whose image points 10 are disposed in twelve rows and twenty columns. The linework component contains three graphic objects 11, 12, and 13, which have different colors. Here, the objects are assigned the color indices 11, 12, and 13 corresponding to the object designation. The color separation values CMYK belonging to the color indices are stored in a color table under these color indices. The background has the color index 0. The run lengths in the rows 1 to 12 are listed in a list. The run-length identification [13|5], for example, designates a run length with the color index FNR=13 and the length LG=5.

Figure 5:
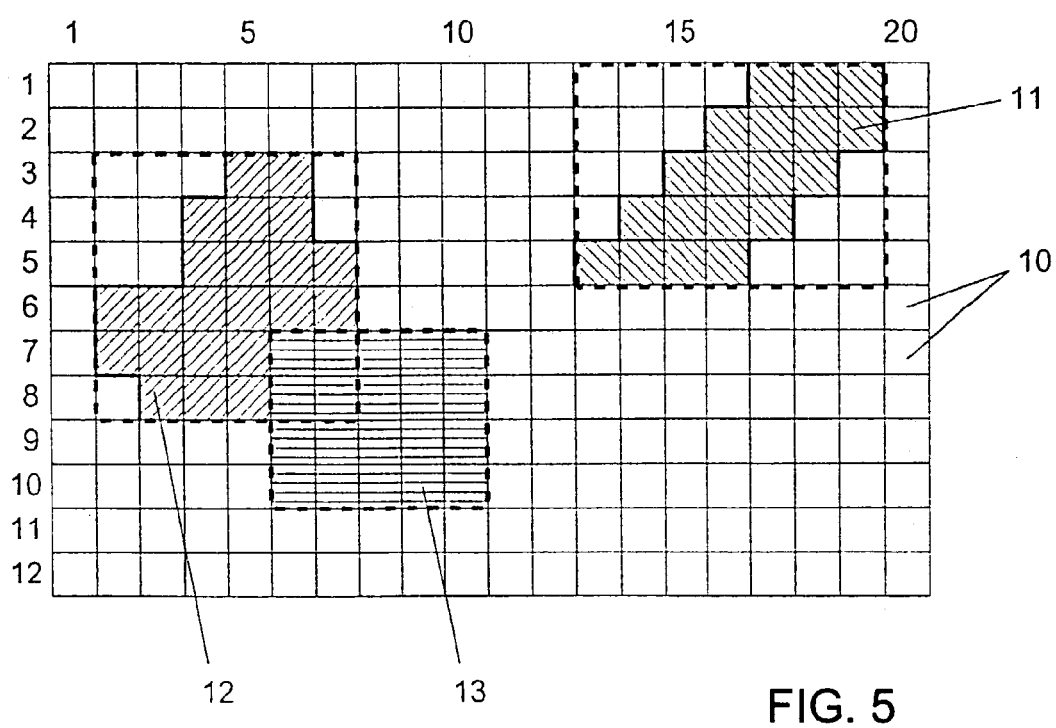
FIG. 5 is a diagrammatic matrix of the linework component of FIG. 4A illustrating circumscribing rectangles of the objects.
Figures 4A, 4B:
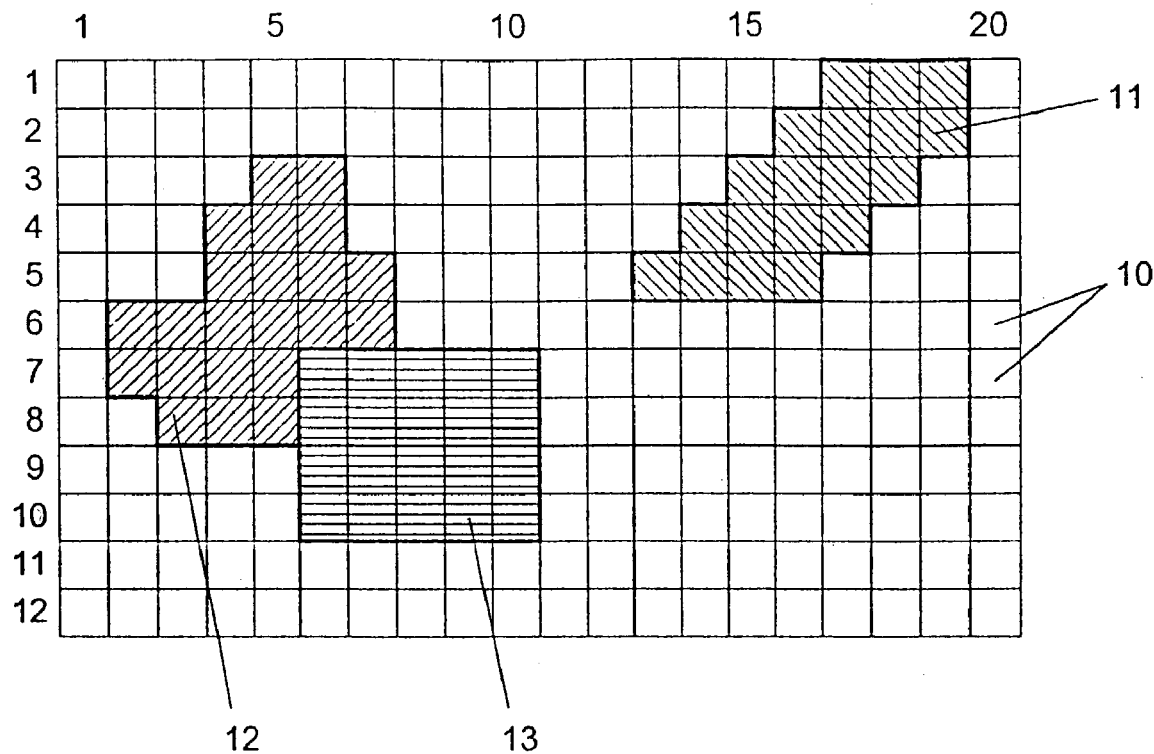
FIG. 4A is a diagrammatic matrix of an example linework component.
FIG. 4B is a tabular list of bitmap run lengths of the linework component of FIG. 4A.

In a first step of the method of the invention, the run lengths of the linework component are run through row-by-row and the run lengths not belonging to the background are in each case assigned to an object. Run lengths that have a corresponding overlapping run length in the preceding row are assigned to the same object to which this run length located above belongs. When a new run length occurs without any correspondence in the previous row, or a run length with a different color than the run length lying above, it is assigned to a new object. At the same time, for each object, the width and the height of a circumscribing rectangle are updated continuously and stored. In the example of FIGS. 4A and 4B, in row 1, the run length [11|3] is encountered as the first run length different from the background. It is assigned to a new object 11, and the dimensions of the circumscribing rectangle are initially set to 3×1 (width×height). In row 2, the run length [11|4] is encountered, which has the same color and has an overlap with the run length in the previous row. It is, therefore, assigned to the same object 11, and the circumscribing rectangle is updated to the dimensions 4×2. In row 3 there are two run lengths, [12|2] and [11|4]. The first run length has a new color and is, therefore, assigned to a new object 12, whose circumscribing rectangle is given the dimensions 2×1. The second run length is recognized as a continuation of the object 11 on account of the color and the overlap with the run length in the previous row, and the circumscribing rectangle is updated to the dimensions 5×3. If, in a row belonging to an object, no more overlapping run lengths are encountered, such as for the object 11 in row 6, the object has been completed and the last updated dimensions of the circumscribing rectangle apply, that is to say, the dimensions 7×5 for the object 11. After the first operation has been carried out for all the run lengths contained in the linework component, all the objects and their circumscribing rectangles have been determined. FIG. 5 shows the circumscribing rectangles found as dashed outlines.

According to a preferred variant of the invention, during the first operation, it is additionally established whether or not an object is a rectangle, that is to say whether there are only image points of one color within the circumscribing rectangle and no background image points are contained either. For such a purpose, for example, the image points having the object color are counted and the resulting number P is updated from row to row until the object has been completed. If the number P determined is equal to the total number of image points in the circumscribing rectangle, that is to say, P=width×height, the object is rectangular. The rectangular objects are, then, converted to the rectangular operator "rectfill" of the PDF format. They have, therefore, been described in a particularly compact and time-saving manner for subsequent further processing. The rectangle operator describes a rectangle by using only four values, the coordinates x0 and y0 of one corner and the width and the height. In addition, the color with which the rectangle is to be filled must be specified.

In an optional but preferred second step, a check is made as to whether or not objects of the same color can be combined to form a larger object. One criterion for such combination is whether the horizontal or vertical spacing of the associated circumscribing rectangles does not exceed a predefined maximum dimension. If such is the case, that is to say, if the objects are sufficiently closely adjacent, they are combined into a larger circumscribing rectangle. This is particularly advantageous for texts in which, in the first operation, each individual letter has been isolated as a separate object.

FIGS. 6A and 6B show an example of this where the circumscribing rectangles of the letters (FIG. 6A) are combined (FIG. 6B) to form an encompassing rectangle for the entire word. Depending on the predefined maximum spacing dimension, a plurality of words, whole lines of text or whole blocks of text can also be combined. The advantage is, firstly, that, in this way, partial objects that frequently cohere logically, that is to say, the letters of a word, are subsequently converted to the PDF format as an object. Secondly, the number of objects to be converted is reduced sharply, and the description of the combined objects in the PDF data becomes correspondingly compact. As a result of the compact object description, the further processing, for example, the interpretation of the PDF data or interactive corrections, is accelerated considerably. Objects that previously have been identified as rectangles are, preferably, not included in the combination with other objects because the description of these objects with the rectangle operator is the form of the description that is most compact and most beneficial for further processing. However, it is expedient to carry out the separate conversion of rectangles starting only from a minimum size and, nevertheless, to combine very small rectangular objects with other adjacent objects because the quantity of data of the converted PDF data can be optimized as a result.

The compactness of the description of the objects in the PDF data can also be used as an alternative or additional criterion for the combination. Because the quantity of data in the PDF format for each object to be converted is known or can be determined in advance based upon the object size, it is established whether or not a combined object results in a smaller quantity of data in the PDF data than the PDF descriptions of the individual objects. If this is so, the combination is carried out. On the other hand, if the result is that the combined object produces a substantially larger quantity of data in the PDF data than the individual objects, the combination is not carried out. The threshold values for such a decision are, expediently, determined by experimenting with different variations of the criteria for the combination. For example, the further processing of the PDF data may be faster, even in spite of a relatively large quantity of data for the combined object, than with the individual objects, simply because otherwise, due to the relatively large number of individual objects, many more objects have to be interpreted, which for each object entails a certain "overhead," that is to say, additional computing time during which no image points are processed. Alternatively, the decision thresholds can also be made adjustable for the user, by appropriate adjustment possibilities being provided in the operator interface of a program that carries out the conversion.

In addition to the combination of objects, a further embodiment of the invention also provides for dividing up a very large object into a number of small objects. If a large object is, for example, a frame that has the width and height of the entire printed page, then such an object would produce a large quantity of data following the conversion to the PDF data. In such a case, the frame will be divided into smaller objects, whose circumscribing rectangles together encompass far fewer image points than the circumscribing rectangle of the large object. The compactness of the converted PDF data for the partial objects is expediently used as a criterion for establishing the division limits, that is to say, the division is performed such that as small a quantity of data as possible is produced after the conversion. Here, too, the suitable decision thresholds have to be determined experimentally.

In a third step of the method of the invention, the non-rectangular objects are converted into PDF data, by being described with the operator "image mask," which is available in the PostScript and in the PDF page description language. Associated with the image mask operator is a bitmap whose image points have the value 0 or 1. FIG. 7 shows, as an example, the bitmap 14 for a letter, a very coarse image point resolution having been selected to simplify the illustration. The actual image point resolution is substantially higher as compared with the dimensions of the letter. The image points with the value 0 are illustrated in white and the image points with the value 1 in black. During the subsequent interpretation of the PDF data, the image mask operator positions the bitmap 14 at a point on the printed page defined by coordinates that are also provided, and, then, fills the image points that have the value 1 in the bitmap 14 with a previously defined color. The image points that have the value 0 in the bitmap 14 are not changed. The bitmap 14 of the image mask operator, therefore, acts like a stencil in which the image points having the value 1 are holes, through which the color is painted onto the printed page. The bitmap 14 of an object that has been determined in steps 1 and 2 of the method has the dimensions of the circumscribing rectangle found there. Its content, that is to say, the configuration of the image points having the value 0 and having the value 1, is given in a simple way by which image points in the circumscribing rectangle are occupied by the run lengths with the object color (image points having the value 1) and that are occupied by run lengths with other colors, including the background color (image points having the value 0). Large bitmaps can be stored compactly in the PDF data, by being compressed with a data compression method available in the PDF page description language, for example, with the operator "CCITTFaxEncode." Such an operator compresses the bitmaps 14 in accordance with the method that is standardized internationally for digital fax transmission.

Figure 9:
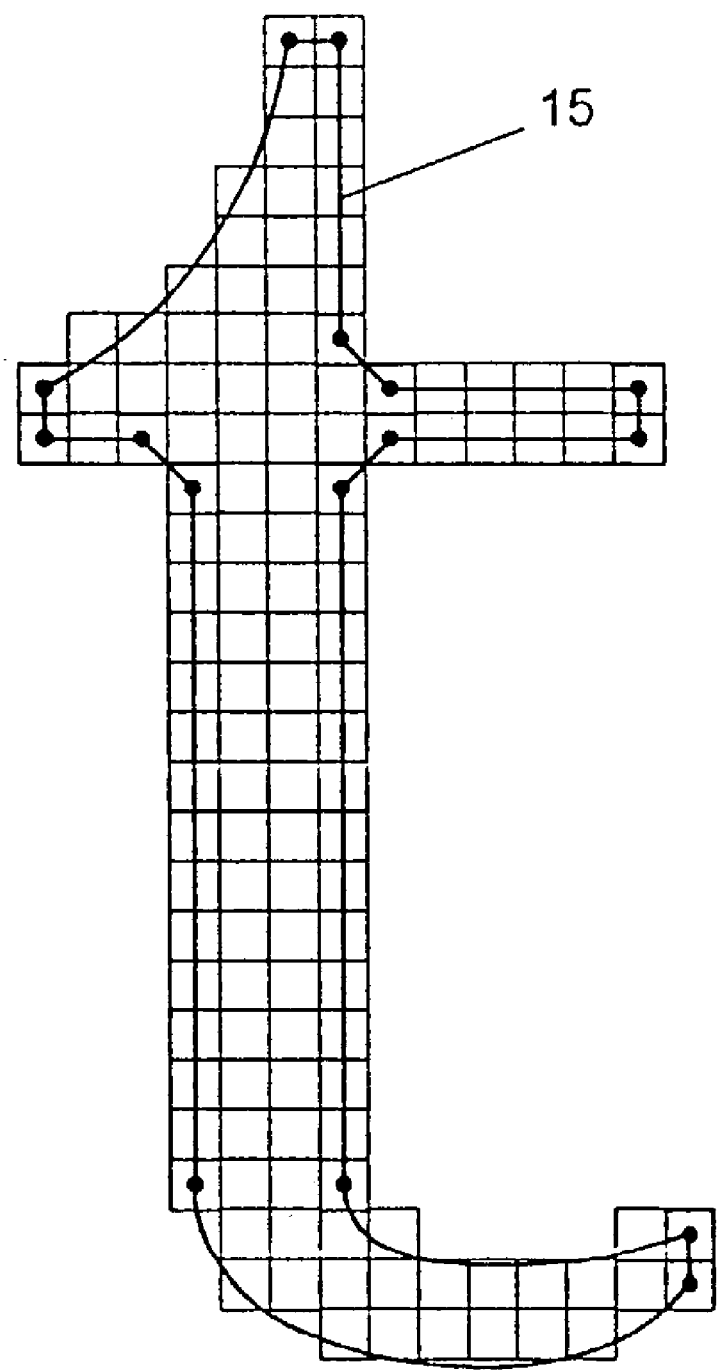
FIG. 9 a diagrammatic illustration of an approximated polygon train of the object of FIG. 7.

In an alternative embodiment of the invention, the objects found in the first step are converted into a closed polygon train, which is, then, filled with a previously defined color. In the PDF page description language, the operators "moveto," "lineto," and "closepath" are available for describing a closed polygon train. FIG. 8 shows the polygon train 15 using the example of a letter. The polygon train 15 is formed by reference points 16, which are connected by horizontal, vertical and diagonal lines, being placed at the edges of the run lengths that form the object in the linework component. A new reference point 16 is placed every time the line train changes its direction as it runs around the edge of the object. If the polygon trains 15 converted to PDF data are subsequently interpreted and rastered at the same resolution in which the linework component is also present, then the form of the reconstructed objects coincides exactly with the form of the objects in the linework data. The conversion of an object to a closed polygon train 15 has the advantage, however, that the object is described regardless of the resolution, and geometric operations such as a size change or rotation can, subsequently, be carried out very much more simply and more quickly. In addition, the description of the polygon trains 15 in the PDF data is still more compact than the description with the image mask operators. The processing times during the interpretation and rastering or during interactive processing of the objects are also correspondingly shorter. For further simplification, the polygon trains 15 can be smoothed further, by approximating a plurality of successive reference points 16 by interpolated straight-line or curve sections. FIG. 9 shows an example of such approximation. To interpolate the reference points 16, the prior art methods for such geometric operations can be used.

The alternative embodiments of the invention explained can also be mixed during the conversion of linework data to PDF data. For example, it is expedient to convert small objects with a very complex structure, for example, Chinese characters, to the PDF description with the aid of the image mask operator and the associated bitmap 14. A polygon description would require the coding of very many reference points 16 and correspondingly many lineto operators in order to describe a very small area on the printed page. For large and more simply structured objects, however, conversion into a closed polygon train 15 is more advantageous because a relatively large area on the printed page can be described with only a few lineto operators.

I claim:

1. A method for converting image data coded with run lengths to a format of a page description language, the run lengths identifying how many image points of one color follow one another in one image row, which comprises:
   forming at least one object utilizing run lengths of a same color that overlap in successive image rows;
   while forming the object, determining a circumscribing rectangle belonging to the object, and determining whether or not the object is a rectangle; and
   depending on the determination of the object, describing the object with different operators from the page description language.

2. The method according to claim 1, which further comprises dividing up the object into partial objects.

3. The method according to claim 1, which further comprises describing the object in the page description language with an image mask operator and an associated bitmap.

4. The method according to claim 1, which further comprises describing an object that is a rectangle in the page description language with a rectangle operator.

5. The method according to claim 1, wherein the object has an edge, and which further comprises describing the object in the page description language as a polygon train connecting reference points on the edge of the object.

6. The method according to claim 5, which further comprises approximating parts of the polygon train by at least one of interpolated straight-line sections and interpolated curve sections.

7. The method according to claim 1, wherein the page description language is one of PostScript and PDF.

8. The method according to claim 1, which further comprises describing the object in the page description language with an image mask operator and an associated bitmap.

9. The method according to claim 1, wherein the object has an edge, and which further comprises describing the object in the page description language as a polygon train connecting reference points on the edge of the object.

10. The method according to claim 9, which further comprises approximating parts of the polygon train by at least one of interpolated straight-line sections and interpolated curve sections.

11. The method according to claim 1, which further comprises determining in advance a size of the combined object and carrying out the combining step in dependence on the size.

12. The method according to claim 11, which further comprises dividing up the object into partial objects if a smaller quantity of data can be achieved with the partial objects.

13. The method according to claim 1, which further comprises combining a plurality of objects of the same color in one circumscribing rectangle.

14. The method according to claim 13, which further comprises not combining objects that are a rectangle with other objects.

15. The method according to claim 14, wherein an object that is a rectangle is described in the page description language with a rectangle operator.

* * * * *